United States Patent [19]

Newman et al.

[11] Patent Number: 5,887,107
[45] Date of Patent: Mar. 23, 1999

[54] STRAIN RELIEVING FIBER OPTIC MULTIPLEXER PACKAGE

[75] Inventors: Donald T. Newman, Severna Park, Md.; William C. Swann, Lafayette, Colo.

[73] Assignee: CIENA Corporation, Linthicum, Md.

[21] Appl. No.: 833,783

[22] Filed: Apr. 9, 1997

[51] Int. Cl.[6] .............................. G02B 6/00; H04J 14/08
[52] U.S. Cl. .............................. 385/137; 385/12; 385/13; 385/37; 385/123; 359/115; 359/124; 359/127; 359/130
[58] Field of Search .................................. 385/12, 13, 39, 385/37, 123, 141, 137; 372/6; 250/227.11, 227.14, 227.18, 227.19; 359/115, 124, 127, 130

[56] References Cited

U.S. PATENT DOCUMENTS

| | | | |
|---|---|---|---|
| 5,095,514 | 3/1992 | Curtis ......................................... | 385/12 |
| 5,201,015 | 4/1993 | Von Bieren et. al. ..................... | 385/13 |
| 5,317,576 | 5/1994 | Leonberger et al. ...................... | 372/6 |
| 5,367,589 | 11/1994 | MacDonald et al. ..................... | 385/37 |
| 5,394,488 | 2/1995 | Fernald et al. ............................ | 385/13 |
| 5,444,803 | 8/1995 | Kim et al. ................................. | 385/28 |
| 5,483,607 | 1/1996 | O'Keefe ................................... | 385/11 |
| 5,649,035 | 7/1997 | Zimmerman et al. ................... | 385/13 |
| 5,694,501 | 12/1997 | Alavie et al. ............................ | 385/37 |

*Primary Examiner*—Brian Healy
*Attorney, Agent, or Firm*—David L. Soltz

[57] ABSTRACT

A fiber optic package is provided in which substantially zero strain is exerted on a portion of an optical fiber containing a Bragg grating. The package includes a fastener securing a first portion of the optical fiber and a mandrel, for example, around which a second portion of the fiber is looped. The Bragg grating is preferably located between the first and second portions of the optical fiber. As a result, the portion of the optical fiber containing the Bragg grating is isolated from stresses originating in parts of the optical fiber beyond the mandrel and the fastener. The portion of the optical fiber containing the Bragg grating, therefore, remains substantially stress-free.

19 Claims, 6 Drawing Sheets

STRAIN RELIEVING FIBER OPTIC MULTIPLEXER PACKAGE

FIELD OF THE INVENTION

The present invention relates to a package for housing an optical fiber, and more particularly, a package that exerts minimal strain on portions of an optical fiber containing a Bragg grating.

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and local area networks (LANs). Optical systems are described in Gowar, Ed. *Optical Communication Systems*, (Prentice Hall, New York) c. 1993, the disclosure of which is incorporated herein by reference. Currently, the majority of optical communication systems are configured to carry an optical channel of a single wavelength over one or more optical waveguides. To convey information from plural sources, time-division multiplexing (TDM) is frequently employed. In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. In a WDM system, plural optical signal channels are carried over a single waveguide with each channel being assigned a particular wavelength. Such systems typically include a plurality of receivers, each detecting a respective channel by effectively filtering out the remaining channels. Further, in WDM systems, it is advantageous to add and drop channels at intermediate nodes along the waveguide.

Accordingly, in order to achieve channel filtering and add/drop in a WDM system, selectively reflective elements are provided at the receivers, as well as the intermediate nodes along the waveguide. Generally, these elements reflect signals only at a specified wavelength, while passing those signals at wavelengths other than the reflected wavelength. Selectively reflective elements are also used to filter out undesired light generated by stimulated emission in fiber amplifiers used in repeaters of the WDM system.

Typical selectively reflective elements include in-fiber Bragg gratings, which, as shown in FIG. 1, generally constitute a periodic variation in refractive index n over fiber length L. Bragg gratings are described in Morey et al., *Photoinduced Bragg Gratings in Optical Fibers*, Optics & Photonics News, February 1994, pp. 9–14, and A. M. Vengsarkar et al., *Long-Period Fiber Gratings As Band-Rejection Filters*, Journal of Lightwave Technology, vol. 14, no. 1, January 1996, pp. 58–65, the disclosures of which are incorporated herein by reference.

The periodic variation in refractive index can take the form of a series of "peaks" and "valleys", as shown in FIG. 1, whereby the distance or period T between two adjacent refractive index peaks defines, in part, the wavelength to be reflected by the Bragg grating. Stresses, such as tensional and compressional strains on the optical fiber containing the Bragg grating, can cause period T to deviate from its intended value. As a result, the grating may transmit the channel to be reflected, and, conversely, reflect the channels to be transmitted. Thus, signal detection at the receiver is degraded, and it is difficult to add signals and drop signals from the waveguide.

Thus, there is a need in the art for a fiber optic package which eliminates stresses on a segment of optical fiber containing the Bragg grating.

SUMMARY OF THE INVENTION

Consistent with the present invention, an optical device is provided comprising an optical fiber having first, second and third portions. The second portion of the optical fiber, generally containing the Bragg grating, is located between the first and third portions, and a fastening member is attached to the first portion of the optical fiber. Further, the third portion of the optical fiber is bent about a substantially arcuate member such that a substantially constant strain is exerted on the second portion of the optical fiber. Typically, this strain is substantially equal to zero.

In accordance with a further aspect of the present invention, a method of reducing strain in a segment of an optical fiber is provided, comprising the steps of: securing a first portion of the optical fiber to a fastening member; and looping a second portion of said optical fiber about an arcuate member, whereby a strain exerted on a third portion of the optical fiber located between the first and second portions is substantially zero.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

A fiber optic package is provided in which substantially zero strain is exerted on a portion of an optical fiber containing a Bragg grating. The package includes a fastener securing a first portion of the optical fiber and a mandrel, for example, around which a second portion of the fiber is looped. The Bragg grating is preferably located between the first and second portions of the optical fiber. As a result, the third portion of the optical fiber containing the Bragg grating is isolated from stresses originating in parts of the optical fiber beyond the fastener and the mandrel. The portion of the optical fiber containing the Bragg grating, therefore, remains substantially stress-free.

Figure 1:
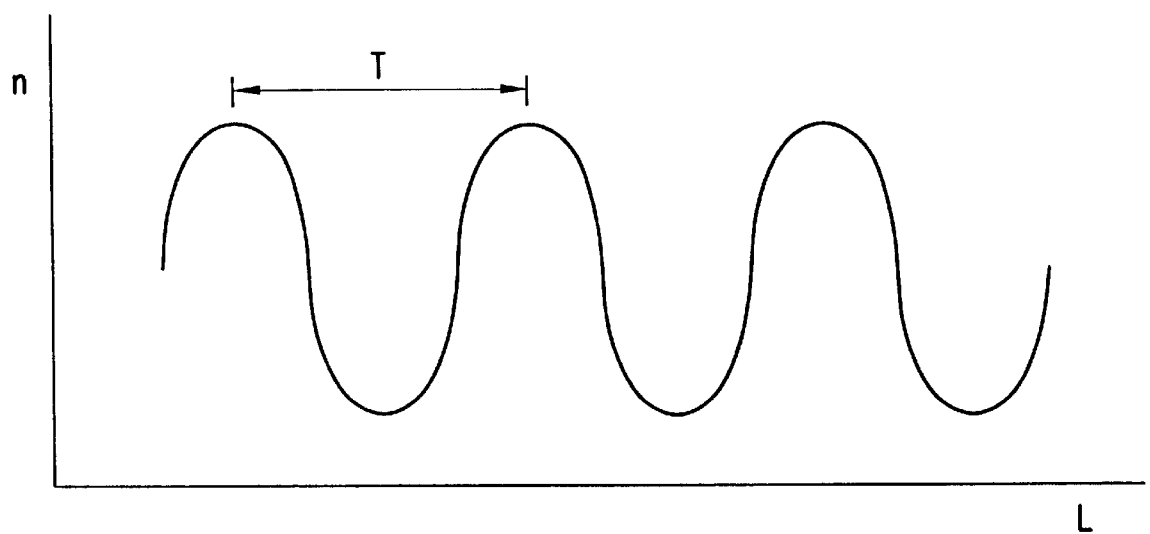
FIG. 1 is a plot of refractive index n vs. fiber length L for an in-fiber Bragg grating.
Figure 2:
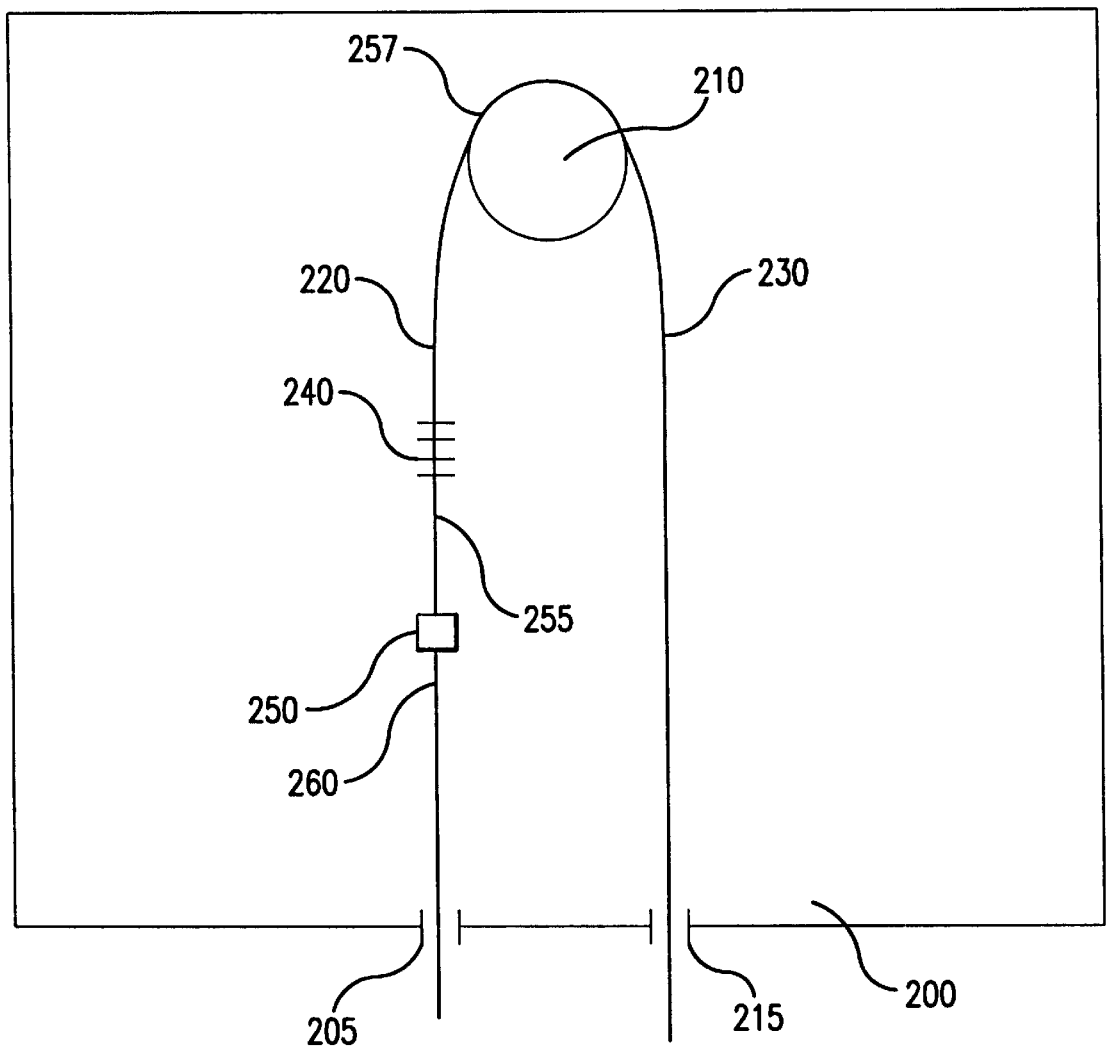
FIG. 2 is a schematic diagram of a fiber optic package in accordance with the present invention.

Turning to the drawings in which like reference characters indicate the same or similar elements in each of the several views, FIG. 2 is a simplified view of a fiber optic package 200 in accordance with the present invention. Optical fiber 255 is input through a first port 205 of package 200 and extends continuously through package 200 to output port 215. A fiber mount or fastener 250 secures a first portion of optical fiber 255 while a second portion 257 is looped or bent about an arcuate member, such as mandrel 210. Preferably, the bend radius of optical fiber portion 257 is greater than the critical bend radius of the optical fiber in order to avoid breakage and insure proper transmission through the fiber.

Figure 3:
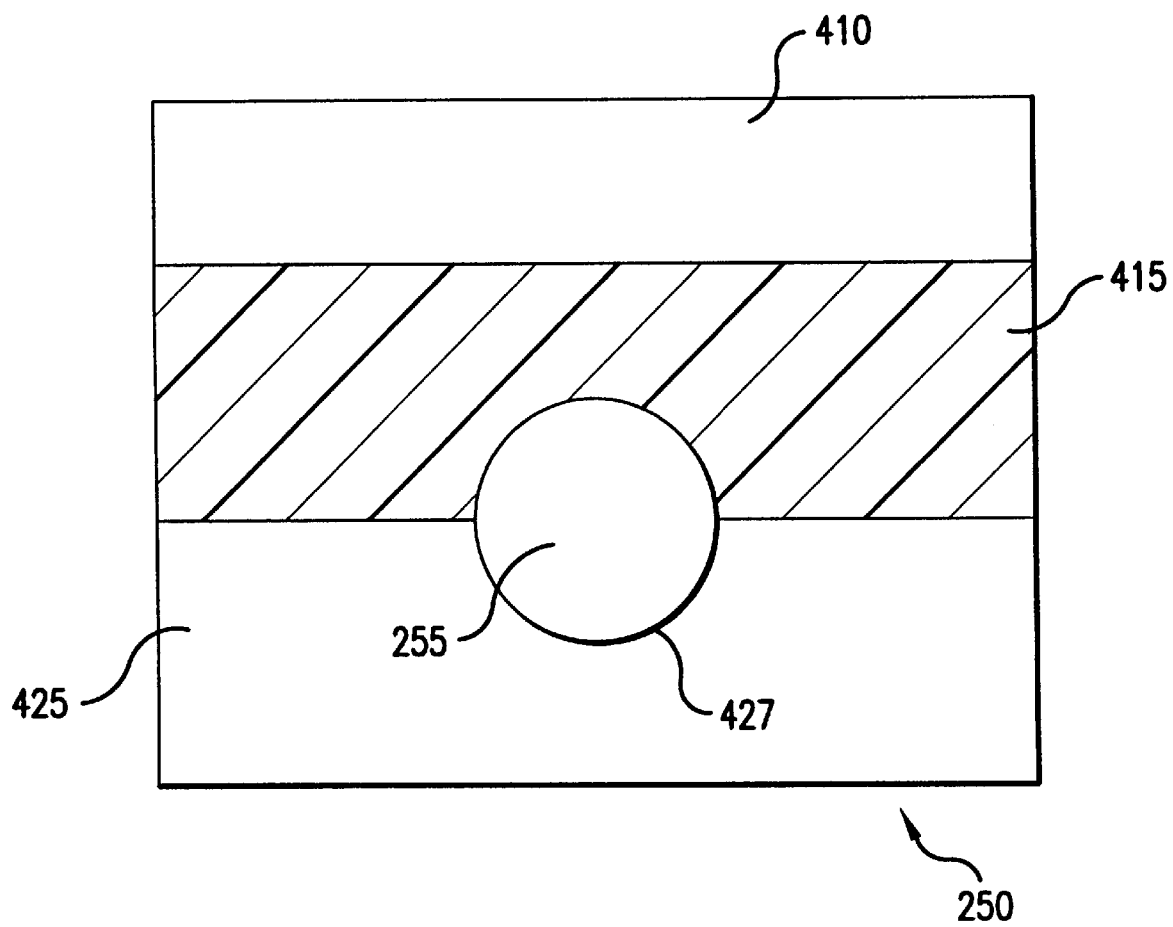
FIG. 3 is a cross-sectional view of a fastener in accordance with the present invention.

As shown in FIG. 3, fastener 250 typically includes a substantially flexible or compliant member 415, made of, for example, polyurethane, which is sandwiched between two rigid support members 410 and 425, respectively. As further shown in FIG. 3, optical fiber 255 is typically positioned within groove 427 in support member 425 and secured in place by compressing compliant member 415 between support members 410 and 425.

Again referring to FIG. 2, a third portion 220 of optical fiber 255 including Bragg grating 240 is provided between fastener 250 and mandrel 210. Thus, strains exerted on optical fiber portion 260 are isolated from Bragg grating 240 by fastener 250. Moreover, mandrel 210 continuously distributes strains in fiber portion 257 so that strains exerted on optical fiber portion 230 are isolated from Bragg grating 240. As a result, portion 220 of optical fiber 255 is substantially strain free.

Figure 4:
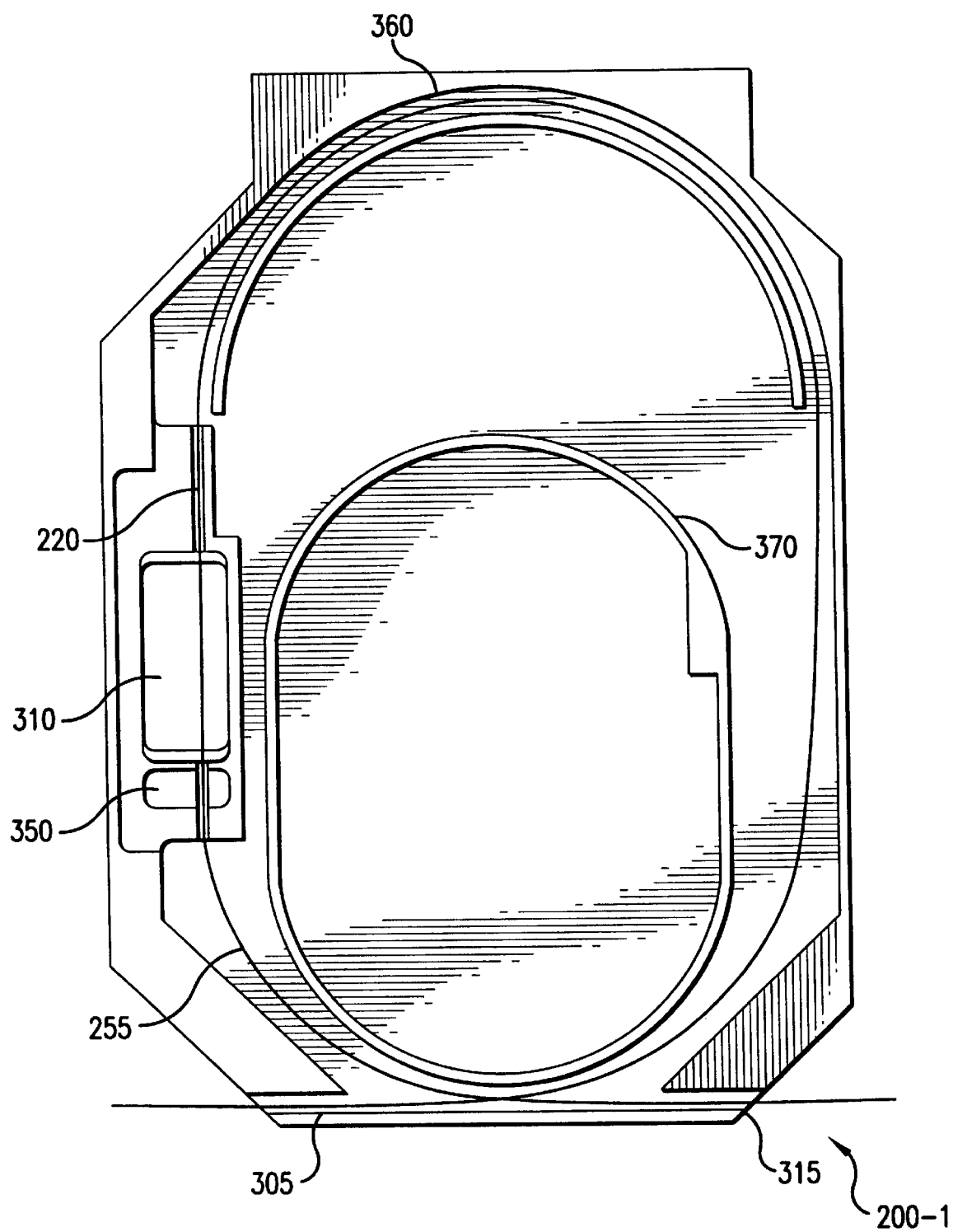
FIG. 4 is a plan view of a section of a fiber optic package in accordance with an embodiment of the present invention.

FIG. 4 illustrates, in greater detail, housing half 200-1 of package 200 in accordance with a further embodiment of the present invention. Optical fiber 255 enters input port 315 in housing half 200-1 and extends through fastener 350 and arcuate groove 360. As further shown in FIG. 4, optical fiber 255 is bent about annular member 370 and crosses itself before exiting through output port 305.

Preferably, in order to avoid a break in optical fiber 255, the radius of arcuate groove 360 exceeds the critical bend radius of optical fiber 255. Moreover, although not shown in FIG. 4, optical fiber 255 can be wrapped about annular member 370 a number of times prior to exiting though output port 315, as required.

As further shown in FIG. 4, a portion of optical fiber 255 including the Bragg grating preferably overlies temperature regulating element 310. Temperature regulating element 310 typically includes a thermally conductive plate, made of metal, for example, for transferring thermal energy to or away from the grating. Accordingly, the temperature of the portion of optical fiber 255 containing the Bragg grating can be controlled, and thermal expansion and contraction of the optical fiber, which would otherwise cause undesired variations in period T of the grating, can be avoided.

Figure 5:
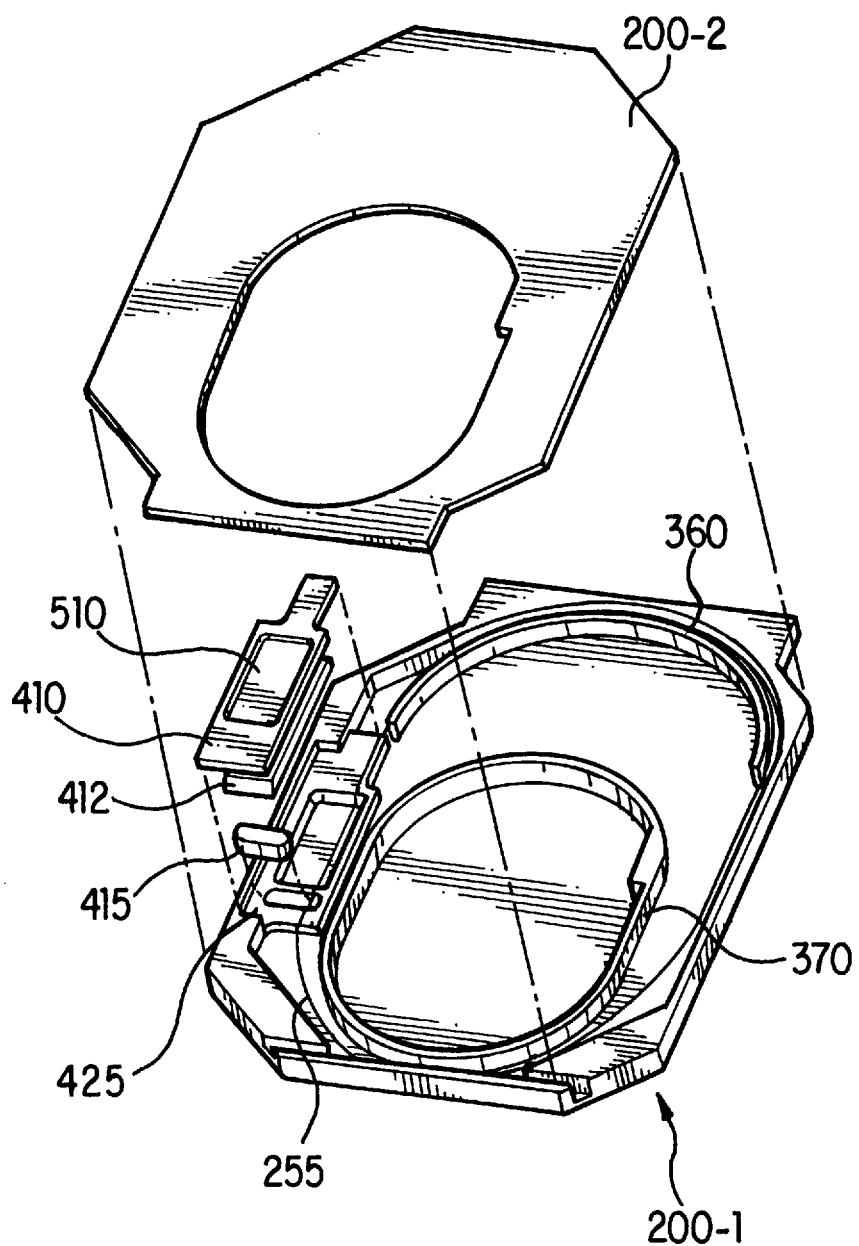
FIG. 5 is an exploded view of the fiber-optic package shown in FIG. 3.

FIG. 5 illustrates an exploded perspective view of the fiber optic package 200 in accordance with the present invention. Package 200 typically includes first and second housing halves, 200-1 and 200-2, which can be mated together once the optical fiber is disposed into housing half 200-1 as discussed above with reference to FIG. 3. As further shown in FIG. 5, support member 410 optionally includes an aperture 510 exposing a portion of top thermally conductive, e.g., metal, plate 412. The portion of optical fiber 255 containing the Bragg grating is sandwiched between metal plate 412 and temperature regulating element 310, thereby insuring proper temperature control.

Figure 6:
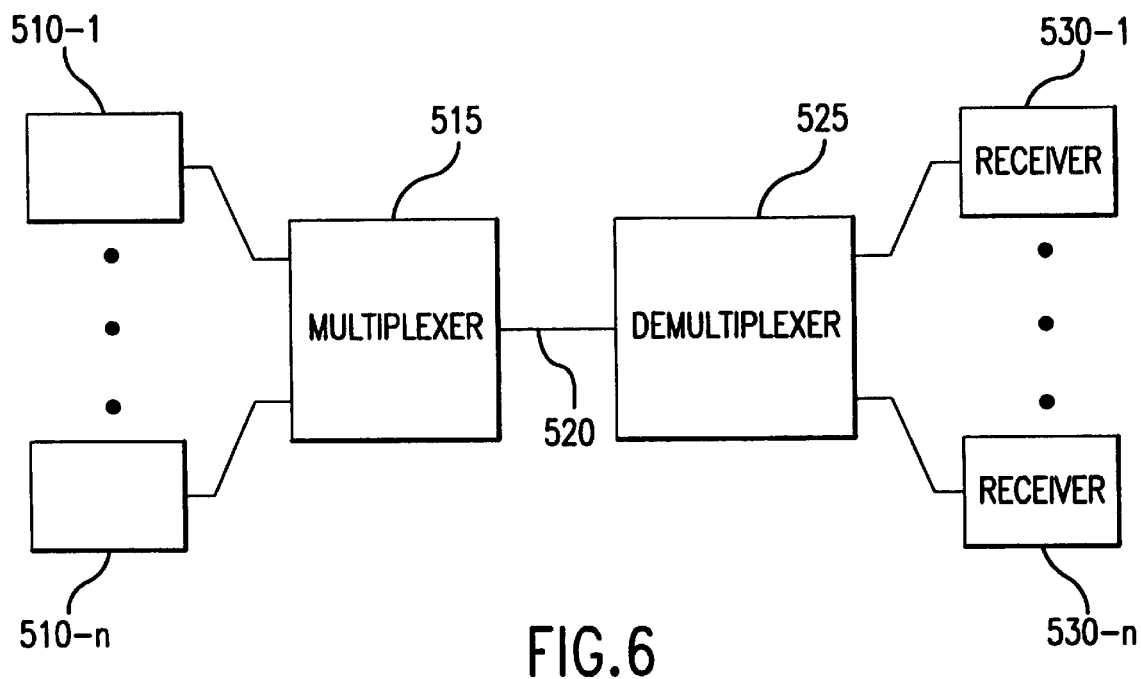
FIG. 6 is a schematic diagram of a WDM system.

FIG. 6 illustrates a WDM system incorporating the above-described fiber optic package. The WDM system generally includes a plurality of transmitters 510-1 . . . 510-n, each of which transmits information bearing optical signal channels at a respective wavelength. The optical signal channels are combined in multiplexer 515 and launched onto optical transmission path 520, which typically includes an optical fiber. To simplify the description herein, repeater systems are not shown along optical transmission path 520. Splitter 525, supplies each of the optical signal channels to receivers 530-1 . . . 530-n, which, in turn, detect a respective one of the optical signals while filtering out the rest.

Figure 7:
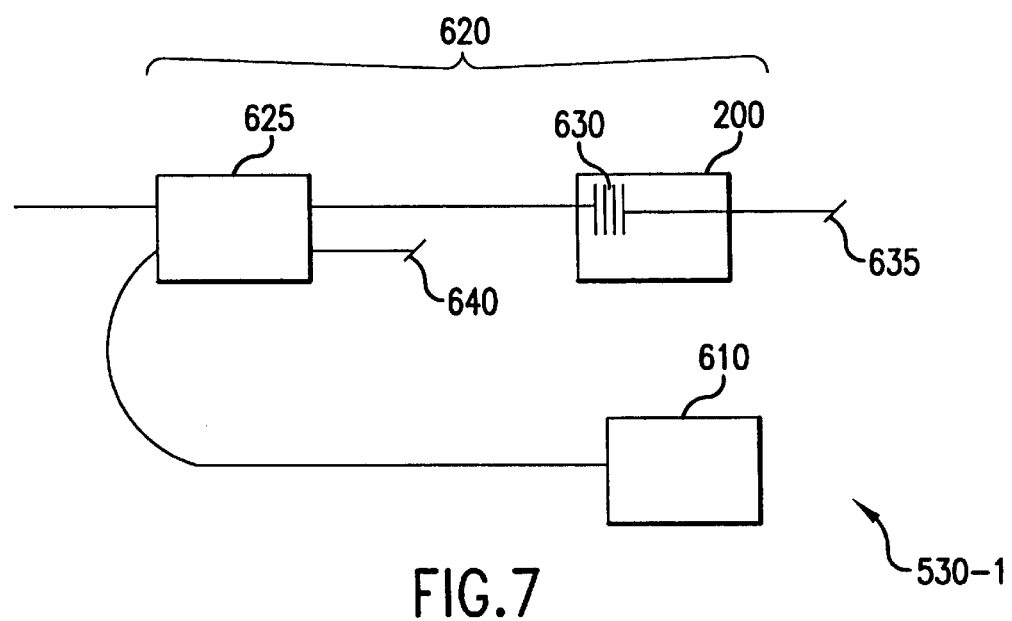
FIG. 7 is a schematic diagram of a receiver shown in FIG. 5.

FIG. 7 illustrates in greater detail exemplary receiver 530-1. Receiver 530-1 includes a demultiplexer 620 for selecting a particular channel from the output of splitter 525 and outputting the selected channel to detector 610. To perform the channel selection, each of the channels are supplied through splitter 625 and to Bragg grating 630 housed in package 200. Bragg grating 630 reflects the desired channel to be sensed at detector 610 and transmits the remaining channels. The remaining channels are passed to low reflectivity port 635, which may typically be an angled fiber cut, although any low reflectivity waveguide termination could be employed. The reflected channel is supplied back to splitter 625, where it is output to detector 610. Unused optical signals exit splitter 625 through low reflectivity port 640.

By providing housing 200 as described above, however, Bragg grating 630 reflects only the desired wavelength, regardless of any commonly encountered stresses or strains exerted on the fiber. Proper operation of the receiver is thus assured.

While the foregoing invention has been described in terms of the embodiments discussed above, numerous variations are possible. For example, the present invention may be incorporated into other fiber optic systems where portions of the fiber must be under substantially zero strain. Accordingly, modifications and changes such as those suggested above, but not limited thereto, are considered to be within the scope of the following claims.

What is claimed is:

1. An optical device comprising:
   an optical fiber having first, second and third portions, said second portion comprising an in-fiber Bragg grating and being located between said first and third portions;
   a fastening member attached to said first portion of said optical fiber; and
   a substantially arcuate member, said third portion of said optical fiber being bent about said substantially arcuate member such that a substantially constant strain is maintained on said second portion of said optical fiber.

2. An optical device in accordance with claim 1, further comprising a temperature regulating element coupled to said second portion of said optical fiber.

3. An optical device in accordance with claim 2, wherein said temperature regulating element further comprises a thermally conductive portion adjacent said second portion of said optical fiber.

4. An optical device in accordance with claim 1, wherein said substantially constant strain is equal to zero.

5. An optical device in accordance with claim 4, wherein said third portion of said optical fiber has a bend radius exceeding a critical bend radius of said third portion of said optical fiber.

6. An optical device in accordance with claim 1, wherein a bend radius of said arcuate member is greater than a critical bend radius of said optical fiber.

7. An optical device in accordance with claim 1, wherein said fastening member comprises:
   a first support member;
   a second support member; and
   a compliant member sandwiched between said first and second support members, said optical fiber being disposed between said compliant member and said first support member, whereby said compliant member is compressed between said first and second support members thereby securing said optical fiber.

8. An optical fiber housing having first and second ports, a first portion of an optical fiber extending through said first port and a second portion of said optical fiber extending through said second port, a third portion of said optical fiber being located between said first and second portions;
   a fiber mount fixing said first portion of said fiber; and
   a substantially arcuate member, said second portion of said optical fiber being bent about said arcuate member such that said third portion is substantially strain-free.

9. An optical fiber housing in accordance with claim 8, wherein said third portion of said optical fiber comprises an in-fiber Bragg grating.

10. An optical fiber housing in accordance with claim 8, further comprising a temperature regulating element coupled to said second portion of said optical fiber.

11. An optical fiber housing in accordance with claim 10, wherein said temperature regulating element further comprises a thermally conductive portion adjacent said second portion of said optical fiber.

12. An optical fiber housing in accordance with claim 8, wherein a radius of said arcuate member is less than a critical bend radius of said optical fiber.

13. An optical fiber housing in accordance with claim 9, further comprising:
   a first thermally conductive plate; and
   a second thermally conductive plate, said in-fiber Bragg grating being sandwiched between said first and second thermally conductive plates.

14. A wavelength division multiplexed system, comprising:
   an optical communication path having first and second end portions;
   a plurality of transmitters coupled with said first end portion of said optical communication path, each said plurality of transmitters transmitting optical signals at a corresponding one of a plurality of wavelengths;
   a plurality of receivers coupled with said second end portion of said optical communication path said optical receivers being configured to receive a respective one of said plurality of optical signals; each said receivers comprising:
      a package housing a portion of an optical fiber coupled to said optical communication path, said package comprising a fiber mounting member fixing a first segment of said optical fiber, and an arcuate member whereby a second segment of said optical fiber is bent about said arcuate member, said optical fiber including a reflective element positioned between said first and second segments for reflecting one of said plurality of optical signals.

15. A wavelength division multiplexed system in accordance with claim 14, wherein said reflective element comprises an in-fiber Bragg grating.

16. A wavelength division multiplexed system in accordance with claim 15, further comprising a temperature regulating element coupled to said in-fiber Bragg grating.

17. A wavelength division multiplexed system in accordance with claim 16, wherein said temperature regulating element further comprises a thermally conductive portion adjacent said in-fiber Bragg grating, thereby adjusting a temperature of said in-fiber Bragg grating.

18. A wavelength division multiplexed system in accordance with claim 15, wherein substantially zero strain is exerted on said in-fiber Bragg grating.

19. A wavelength division multiplexed system in accordance with claim 14, wherein said second segment of said optical fiber has a bend radius exceeding a critical bend radius of said second segment of said optical fiber.

* * * * *